United States Patent [19]
Stein et al.

[11] Patent Number: 5,056,199
[45] Date of Patent: Oct. 15, 1991

[54] PLASTIC FASTENER TO ATTACH DOOR TRIM PANEL

[75] Inventors: Arthur C. Stein, Grosse Ile; John J. Reynolds, Howell, both of Mich.

[73] Assignee: General Motors Corporation, Detroit, Mich.

[21] Appl. No.: 473,759

[22] Filed: Feb. 2, 1990

[51] Int. Cl.⁵ .............................................. A44B 17/00
[52] U.S. Cl. ....................................... 24/682; 24/297; 264/46.7
[58] Field of Search ................. 24/682, 683, 684, 685, 24/686, 687, 688, 297; 264/46.7, 274, 278

[56] References Cited

U.S. PATENT DOCUMENTS

| | | | |
|---|---|---|---|
| 2,836,215 | 5/1958 | Rapata | 24/297 |
| 3,942,226 | 3/1976 | Barnett et al. | 24/682 |
| 4,106,745 | 8/1978 | Carrow | 264/278 |
| 4,122,583 | 10/1978 | Grittner et al. | 24/297 |
| 4,400,336 | 8/1983 | Thomas | 264/46.7 |
| 4,568,215 | 2/1986 | Nelson | 24/682 |
| 4,716,633 | 1/1988 | Rizo | 24/297 |
| 4,861,208 | 8/1989 | Boundy | 24/297 |
| 4,965,915 | 10/1990 | Steininger | 24/682 |

Primary Examiner—Victor N. Sakran
Attorney, Agent, or Firm—Charles E. Leahy

[57] ABSTRACT

A retainer for receiving a fastener and adapted for loading into a mold for embedment in a trim article molded of molding material. The retainer has a housing having an upper portion for accepting the fastener and a lower portion for embedment in the molded trim article. A flexible lip encompasses the housing for sealingly engaging with the mold thereby preventing the molding material from making contact with the upper portion of the housing and allowing the molding material to make contact with the lower portion of the housing.

6 Claims, 2 Drawing Sheets

ABSTRACT

PLASTIC FASTENER TO ATTACH DOOR TRIM PANEL

The invention relates to a retainer for embedment in a molded trim article and more particularly provides an integral flexible lip for holding the retainer in the mold and preventing molding material from fouling a fastener receiving aperture of the retainer.

BACKGROUND OF THE INVENTION

Door trim panels in motor vehicles are conventionally comprised of a paper board base which is covered with a vinyl or cloth cover material. Apertures are provided in the paper board base for receiving the threaded head of a conventional plastic fastener. Such a fastener has a plurality of conical barbs which are pressed into openings in the steel door inner panel to attach the trim panel to the door.

An alternate and desirable door inner trim panel construction is the substitution of a molded foam base for the paper board base. In such a door trim panel construction, a sheet of plastic material is placed in the mold and then the foam is injected between the sheet and a mold portion spaced from the sheet at a distance providing the desired thickness of the foam base.

A disadvantage of such a molded foam base is that the foam material does not provide a suitable anchorage for the threaded head of the conventional fastener. It has been recognized as necessary and desirable to embed a plastic retainer in the foam base during the molding process so that the fastener can be mounted on the retainer. Such a retainer is formed of injection molded plastic and has an opening in the face thereof through which the threaded head enters a slot into a cavity.

It has also been recognized as necessary to block the retainer's slot and cavity from the flow of molding material entering the mold during the molding process, so that the cavity will not become filled with molding material. According to the prior art, walls were formed in the mold to cover the cavity in the plastic retainer.

It would be desirable to provide a retainer which could sealingly engage the mold and prevent molding material making contact with the portion of the retainer that has the slot and the cavity.

SUMMARY OF THE INVENTION

This invention provides a retainer for receiving a fastener and adapted for loading into a mold for embedment in a trim article molded of molding material. The retainer has a housing having an upper portion for accepting the fastener and a lower portion for embedment in the molded trim article. A flexible lip encompasses the housing for sealingly engaging with the mold, thereby preventing the molding material from making contact with the upper portion of the housing and allowing the molding material to make contact with the lower portion of the housing.

An object, feature and advantage of the invention is the provision of a flexible lip encompassing the housing of the retainer and adjoining an upper surface of the retainer. The flexible lip and the upper surface of the retainer sealingly engage and position the retainer in the mold to prevent the molding material from making contact with the upper portion of the housing and allow the molding material to make contact with the lower portion of the housing and prevent the retainer from being pushed up to far in the mold.

Further objects, features, and advantages of the present invention will become more apparent to those skilled in the art as the nature of the invention is better understood from the accompanying drawings and detailed description.

DESCRIPTION OF THE PREFERRED EMBODIMENT

Figures 1, 2:
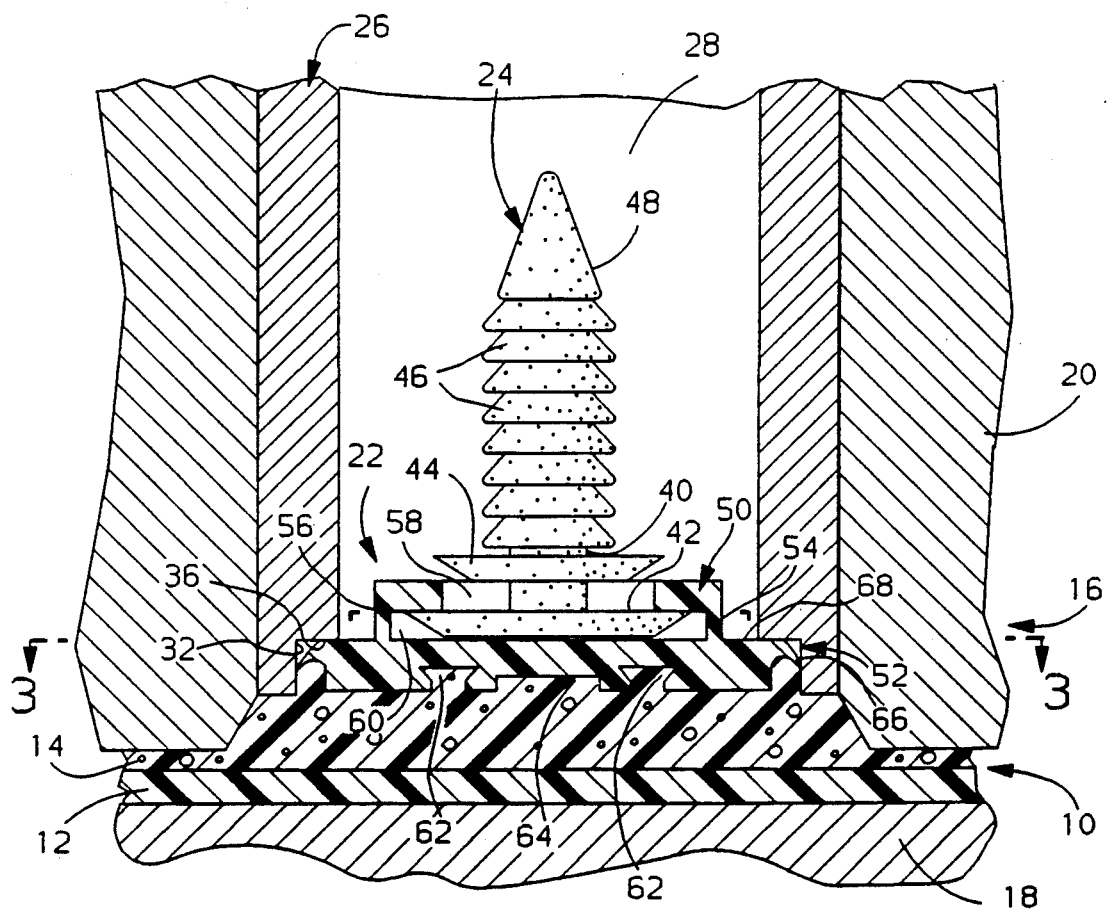
FIG. 1 is an elevation sectional view of the retainer embedded in the molded trim panel located in the mold.
FIG. 2 is a isometric view of the fastener and the retainer.

A molded door panel 10 includes a sheet 12 of cloth or vinyl or other plastic material which is backed by a foam base 14 of a glass reinforced polyurethane material. To mold the door panel 10, the sheet 12 is laid in a mold 16 and the glass reinforced polyurethane is injected to form the foam base 14 as shown in FIG. 1.

The mold 16 has a lower mold 18 on which the sheet 12 is laid, and a upper core 20. The upper core 20 has a bushing 26 with a bushing cavity 28 which receives and holds a retainer 22 and a fastener 24 during the molding process. As shown in FIG. 1, a recess is formed in the bushing 26 at the bottom of the bushing cavity 28 and defines a radial shoulder 36 and an axial wall 32 which cooperate to seat the retainer 22 as will be discussed hereinafter.

The fastener 24 is a conventional fastener for attaching the door panel to the door. As best seen in FIG. 2, the fastener 24 has a cylindrical trunk 40 with a base 42 at one end to be threaded into the retainer 22 and a tip 48 located at the other end. A plurality of directional teeth or conical barbs 46 are molded on the fastener 24 and pushed through a hole in the steel door panel to retain the door panel 10 to the door. A skirt 44 yieldably pushes against the steel door panel to limit insertion of the fastener 24 and to yieldably position the cylindrical trunk 40 such that one of the conical barbs 46 is firmly seated against the steel door panel to provide a firm attachment of the fastener 24 with the steel door panel.

The retainer 22 has a circular upper portion 50 and a circular lower portion or base portion 52 as shown in FIGS. 1 and 2. A pair of risers 54 and 56 separate the lower portion 52 from the upper portion 50 and define a cavity 60. The upper portion 50 has a slot 58 which is elongated. The base 42 of the fastener 24 is threaded into the elongated slot 58 so that fastener 24 has a certain amount of movement relative to the retainer 22.

The retainer 22 has a plurality of dovetail cuts 62 located on the underside of the lower portion 52 as seen in FIG. 1 and 2. The glass reinforced polyurethane flows into the dovetail cuts 52 and cures, so that the inverted "V" shape of the dovetail cuts 52 not only give more surface area for the foam base 14 to adhere to, but also causes the foam base 14 to mechanically grip the retainer 22. The lower portion 52 also has an indentation 64, as shown in FIG. 1 and in hidden lines in FIG. 3, which can be gripped by a loading tool, not shown, for automated loading of the retainer 22 into the mold 16.

The lower portion 52 has a flexible lip 66 that encompasses and is integral to the lower portion 52 of the retainer 22 as shown in FIG. 2. When the retainer 22 is loaded into the bushing 26, as shown in FIG. 1, the flexible lip 66 is flexed and sealingly engages the axial wall 32 of the bushing 26. The circular shape of the retainer 22 facilitates insertion in to the bushing 26. The lower portion 52 has an upper surface 68 which engages with the radial shoulder 36 of the bushing 26 and locates the retainer 22 and prevents the retainer 22 from being pushed up too far in the bushing cavity 28.

THE MOLDING PROCESS

In order to mold the door panel 10, the sheet 12 is laid on the lower mold 18. The retainer 22 with the fastener 24 threaded therein is then inserted in to the bushing cavity 28. Alternatively, the fastener 24 can be threaded into the slot 58 of the retainer 22 after the door panel 10 is molded. The retainer 22 is held in the bushing 26 by the flexible lip 66 pressing against the axial wall 32 of the bushing 26. The upper core 20 and lower mold 18 are then mated together.

As the glass reinforced polyurethane material which forms the foam base 14 enters the mold 16, the retainer 22, which already holds the fastener 24, is pressed against the radial shoulder 36 of the bushing 26. The flexible lip 66 yieldably moves up and towards the axial wall 32 when the polyurethane material presses against the underside, thereby sealingly preventing the polyurethane material from entering behind the flexible lip 66. Accordingly the flexible lip 66 prevents the polyurethane material from fouling the bushing cavity 28, the conical barbs 46 of the fastener 24 or the cavity 60 of the retainer 22. The glass reinforced polyurethane of the foam base 14 is cured with a portion locked in the dovetail cuts 62. After the glass reinforced polyurethane is cured, the mold 16 is opened and the molded door panel 10 with the retainer 22 is removed from the mold 16.

THE SECOND EMBODIMENT

Figure 3:
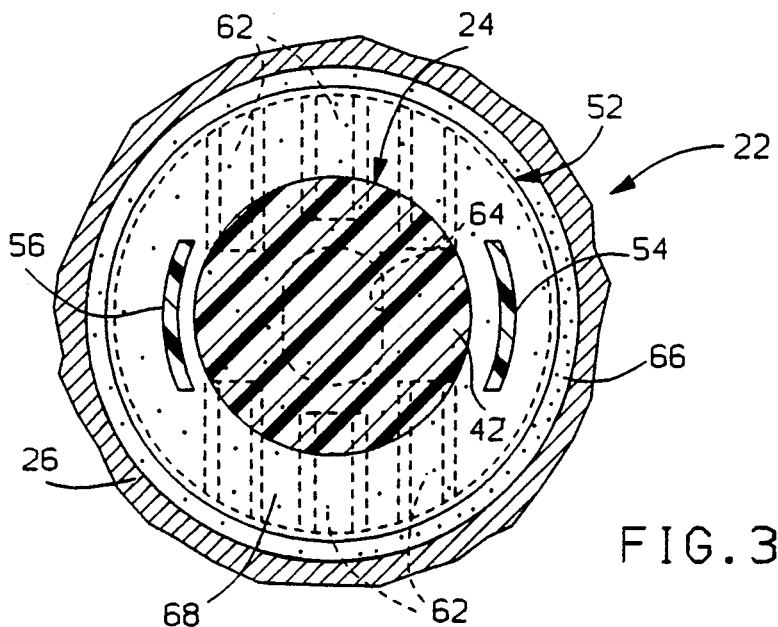
FIG. 3 is a sectional view taken in the direction of arrows 3—3 of FIG. 1.
Figure 4:
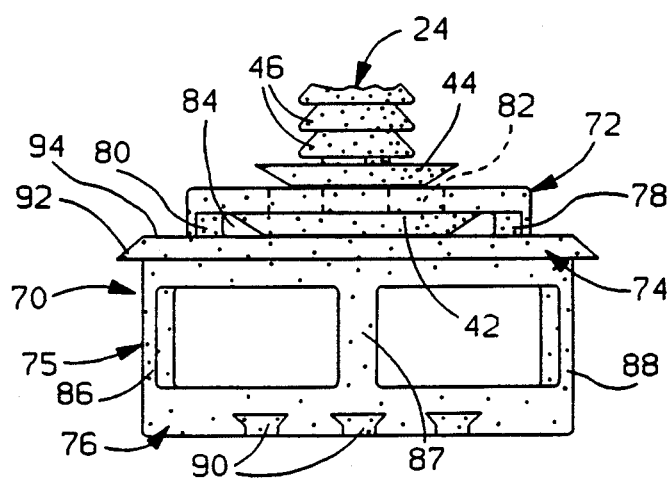
FIG. 4 is an elevation view of a second embodiment of a retainer and fastener.

A second embodiment of the invention, shown in FIG. 4, has a retainer 70 that accepts a fastener 24 identical to that shown in the first embodiment in FIGS. 1, 2 and 3. The retainer 70 has a circular upper portion 72, a circular middle portion 74 and a circular lower portion 76. A pair of risers 78 and 80 separate the middle portion 74 from the upper portion 72 and defines a cavity 84. The upper portion 72 has a slot 82 through which the base 42 of the fastener 24 is threaded.

The lower portion 76 is connected to the middle portion 74 by a set of legs 86, 87 and 88 and forms a base portion 75. The lower portion 76 has a series of dovetail cuts 90 on the underside to facilitate the embedment of the retainer 70 in the glass polyurethane material similar to the first embodiment.

The middle portion 74 has a flexible lip 92 that encompasses the retainer 70. The flexible lip 92 is received by the bushing 26 and sealingly engages with the axial wall 32 of the bushing 26 similarly to the first embodiment shown in FIG. 1. The middle portion 74 has an upper surface 94 which makes contact with the radial shoulder 36 of the bushing 26 and locates the retainer 70 and prevent the retainer 70 from being pushed up to far in the bushing cavity 28.

The retainer of the second embodiment is used when the steel door panel, not shown, is spaced at a distance from the desired location of the door panel 10. The legs 86, 87 and 88 establish the lower portion 76 in proximity with the sheet 12 so that the polyurethane material interposed therebetween is relatively thin to assure dimensional stability irrespective of shrinkage of the material during curing. Accordingly, the glass reinforced polyurethane that flows past the lower portion 76 and into the space between the middle portion and lower portion may shrink upon curing, without affecting the distance between the retainer 70 and the molded door panel 10. The length of the legs 86, 87 and 88 is selected in accordance with the distance between the molded door panel 10 and the steel door panel.

THIRD EMBODIMENT

Figure 5:
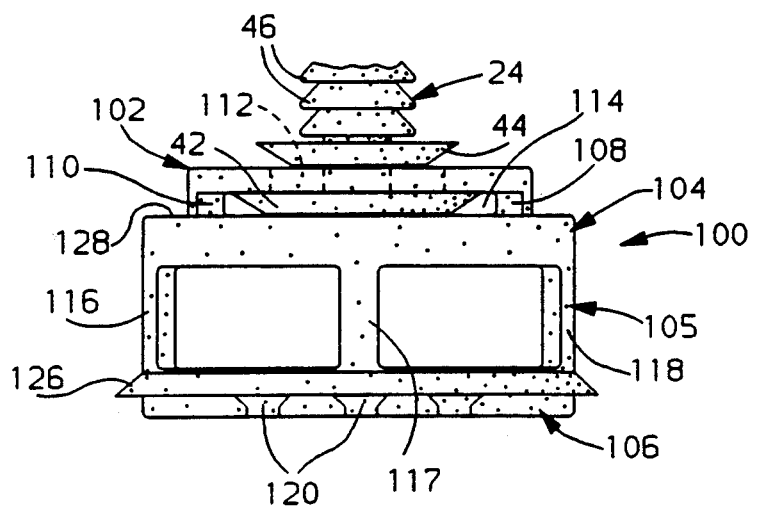
FIG. 5 is an elevation view of a third embodiment of a retainer and fastener.

A third embodiment of the invention, shown in FIG. 5, has a retainer 100 that mounts a fastener 24. The retainer 100 has a circular upper portion 102, a circular middle portion 104 and a circular lower portion 106 similar to the second embodiment. A pair of risers 108 and 110 separate the middle portion 104 from the upper portion 102 and defines a cavity 114. The upper portion 102 has a slot 112 through which the base 42 of the fastener 24 is threaded.

The lower portion 106 is connected to the middle portion 104 by a set of legs 116, 117 and 118 and forms a base portion 105. The lower portion 106 has a series of dovetail cuts 120 to facilitate the embedment of the retainer 100 in the glass reinforced polyurethane.

The lower portion 106 has a flexible lip 126 that encompasses the retainer 100 and sealingly engages the axial wall 32 of the bushing 26 similarly to the first embodiment shown in FIG. 1. The middle portion 104 has an upper surface 128 which makes contact with the radial shoulder 36 of the bushing 26 and locates the retainer 100 and prevents the retainer 100 from being pushed to far up in the bushing cavity 28.

The retainer of the third embodiment is also used when the steel door panel is spaced at a distance from the molded door panel 10. The purpose of the legs 116, 117 and 118 is similar to the those given in the second embodiment establishing the lower portion 106 in proximity with the sheet 12. The flexible lip 126 prevents the glass reinforced polyurethane from flowing past the lower portion 106 and into the space between the lower portion and the middle portion 104. This embodiment would require an axial wall surface 32 of greater length than the second embodiment because the flexible lip 126 is provided on the lower portion 106 and the and the upper surface 128 is provided on the middle portion 104.

Thus both the second and third embodiments allow the molded door panel 10 to be at a distance from the steel door and the flexible lip prevents any glass reinforced polyurethane material from making contact and interfering with the fastener 24 and the slot and cavity of the upper portion of the retainer.

While three embodiments of the present invention have been explained, various modifications within the spirit and scope of the following claims will be readily apparent to those skilled in the art. For example, the sheet 12 of cloth or vinyl or other plastic material may be eliminated by molding the foam base 14 of a molding material which provides a surface suitably decorative and durable to provide the inner surface of the door.

The embodiments of the invention in which an exclusive property or privilege is claimed are defined as follows:

1. A retainer for receiving a fastener and adapted for loading into a mold for embedment in a trim article molded of molding material, comprising:
   a housing having an upper portion for accepting the fastener and a lower portion for embedment in the molded trim article,
   a flexible lip encompassing the housing for sealingly engaging with the mold thereby preventing the molding material from making contact with the upper portion of the housing and allowing the molding material to make contact with the lower portion of the housing.

2. A retainer for receiving a fastener and adapted for loading into a mold for embedment in a trim article molded of molding material, comprising:
   a housing having an apertured upper portion communicating with a cavity for accepting the fastener and a base portion for embedment in the mold trim article, the base portion having a flexible lip encompassing the base portion and flexibly engaging with the mold to seal the base portion against the mold and thereby prevent the passage of molding material into the fastener receiving cavity.

3. A retainer according to claim 2 wherein the retainer is made of a molded plastic and the flexible lip is integral with the retainer.

4. A retainer according to claim 2 wherein the retainer is circular for symmetrical acceptance in the cavity without requirement of alignment.

5. A retainer according to claim 2 wherein the retainer has a plurality of dovetails cuts in the base portion for increasing the surface contact with the molding material.

6. A retainer according to claim 2 wherein the retainer has a shoulder on the base portion for axial locating the retainer in the cavity.

* * * * *